(12) United States Patent
Ellis et al.

(10) Patent No.: US 7,201,049 B2
(45) Date of Patent: Apr. 10, 2007

(54) PULSED THERMISTOR SENSOR

(75) Inventors: David M. Ellis, Warren, VT (US); Rajesh M. Nair, Nashua, NH (US)

(73) Assignee: Degree Controls, Inc., Milford, NH (US)

( * ) Notice: Subject to any disclaimer, the term of this patent is extended or adjusted under 35 U.S.C. 154(b) by 0 days.

(21) Appl. No.: 10/974,494

(22) Filed: Oct. 27, 2004

(65) Prior Publication Data

US 2005/0092078 A1 May 5, 2005

Related U.S. Application Data

(60) Provisional application No. 60/515,963, filed on Oct. 31, 2003.

(51) Int. Cl.
*G01F 1/68* (2006.01)
(52) U.S. Cl. ............... 73/204.25; 73/204.11; 73/204.23; 73/861.95
(58) Field of Classification Search ........... 73/204.25, 73/204.23, 204.11, 861, 202, 202.5, 204.14, 73/204.17, 204.18, 204.19, 95
See application file for complete search history.

(56) References Cited

U.S. PATENT DOCUMENTS

| 4,722,611 | A | * | 2/1988 | Hultgren | 374/43 |
| 4,787,251 | A | * | 11/1988 | Kolodjski | 73/755 |
| 4,821,568 | A | | 4/1989 | Kiske | |
| 4,848,147 | A | | 7/1989 | Bailey et al. | |
| 5,394,746 | A | * | 3/1995 | Williams | 73/204.15 |
| 5,511,415 | A | * | 4/1996 | Nair et al. | 73/204.11 |
| 5,629,482 | A | * | 5/1997 | Vaitkus et al. | 73/204.24 |
| 5,869,758 | A | | 2/1999 | Huiberts | |
| 5,918,473 | A | * | 7/1999 | Gendron et al. | 62/129 |
| 5,929,333 | A | * | 7/1999 | Nair | 73/204.11 |
| 6,023,969 | A | * | 2/2000 | Feller | 73/204.25 |
| 6,450,024 | B1 | * | 9/2002 | McCulloch et al. | 73/204.25 |
| 6,485,175 | B1 | * | 11/2002 | Nimberger et al. | 374/142 |
| 6,763,711 | B1 | * | 7/2004 | Nair et al. | 73/204.15 |

* cited by examiner

*Primary Examiner*—Edward Lefkowitz
*Assistant Examiner*—Freddie Kirkland, III
(74) *Attorney, Agent, or Firm*—Schwegman, Lundberg, Woessner & Kluth, P.A.

(57) ABSTRACT

A thermistor is pulsed with energy, and a time constant of decay of temperature is calculated based on measured resistance of the thermistor over a number of known intervals. The time constant is representative of the mass air flow. The ambient air temperature may be found without waiting for the thermistor to reach the ambient air temperature.

26 Claims, 3 Drawing Sheets

US 7,201,049 B2

PULSED THERMISTOR SENSOR

RELATED APPLICATION

This application claims priority to U.S. Provisional Application Ser. No. 60/515,963 (entitled An Improved Method for Measuring Air Velocity, filed Oct. 31, 2003) which is incorporated herein by reference.

BACKGROUND

Thermistors have long been used to measure mass air flow. If power is supplied to a thermistor, its temperature increases, and its resistance changes. Moving air carries heat away from the thermistor, resulting in a variable amount of power to maintain a predetermined temperature of the thermistor.

If ambient temperature and pressure are known, the thermistor can be calibrated to reflect air velocity at Standard Temperature and Pressure conditions. Heat transfer depends not only on the mass air flow, but also on the difference between the temperature of the heated thermistor and the ambient air temperature. A separate, unheated thermistor may commonly be used to measure the ambient air temperature.

Commercial thermistors are heated, and mass air flow is computed based on the amount of energy required to keep the thermistor at a known state. Unheated sensors are required to measure ambient air temperature, increasing the complexity of mass air flow sensors. Calibration over a large range of temperatures may also be required where the ambient temperature may change significantly. Power consumption may also be high, since the thermistor is continuously heated.

SUMMARY

A thermistor is pulsed with energy, and a time constant of temperature change is calculated based on measured resistance of the thermistor as a function of time. The time constant is representative of the mass air flow. The ambient air temperature may be computed without waiting for the thermistor to reach ambient air temperature.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a controller, such as a digital signal processor, ASIC, microprocessor, or other type of processor operating on a computer system, such as a personal computer, server or other computer system.

Further, implementations described below do not address enhancements that will be evident to practitioners skilled in the arts. These include compensation for energy lost by radiation from the thermistor, energy loss through the wires that support the thermistor, algorithm enhancements to account for air turbulence, and algorithm enhancements to improve accuracy when air temperature changes rapidly.

Figure 1:
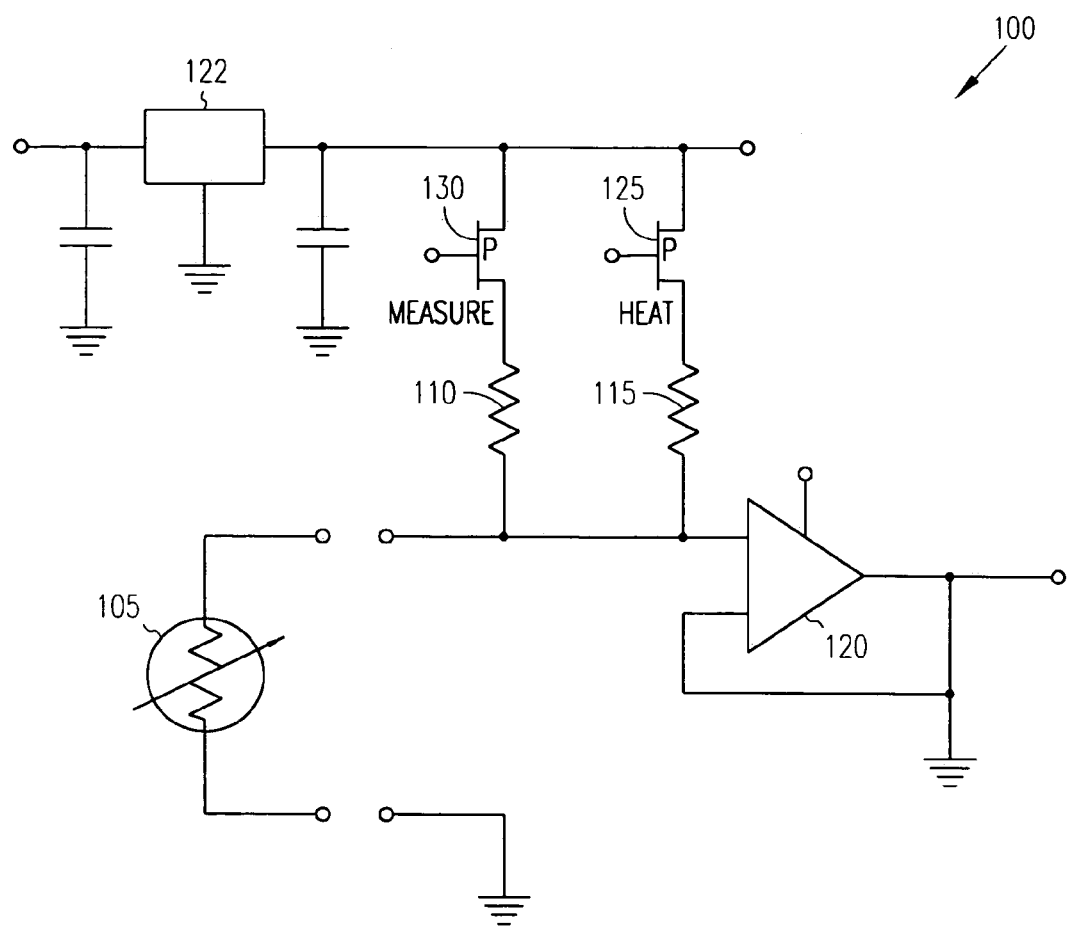
FIG. 1 is a block circuit diagram of a thermistor based mass air flow sensor according to an example embodiment.

FIG. 1 is a circuit diagram of a sensor 100 utilizing a thermistor 105, such as a bead thermistor. In one embodiment, the thermistor is a 2KOhm BR-14 heated bead. One side of the thermistor 105 is coupled to ground, and the other side is coupled to two resistors 110 and 115, and to a voltage following Op Amp 120. The Op Amp 120 is used to provide a reduced impedance level for analog to digital (A/D) conversion.

A voltage source or regulator 122 provides a five volt supply for the sensor 100 and for other circuitry, such as a controller for interfacing with the sensor. Resistor 115 is coupled to a P-channel field effect transistor (FET) 125. Resistor 110 is also coupled to a P-channel field effect transistor (FET) 130. FET 125 is used as a switch to provide current to heat the thermistor 105. Resistor 115 has a relatively low value, approximately 200 ohms in one embodiment to provide a high current to the thermistor 105. FET 130 is used as a switch to provide a lower current, through resistor 110, that has a high resistance of approximately 1000 ohms. Thus, a low current is provided to the thermistor when FET 130 is on and FET 125 is off. FET 125 is referred to as a heating switch, and FET 130 is referred to as a measuring switch. While some heat may be generated from the measuring current, it is minimal, and may be ignored in some embodiments.

In one embodiment, in still air of approximately 25 C. ambient, the thermistor temperature is self limited to approximately 125 C. Typically, the bead is heated to about 80 C. above ambient in about 400 ms.

Figure 2:
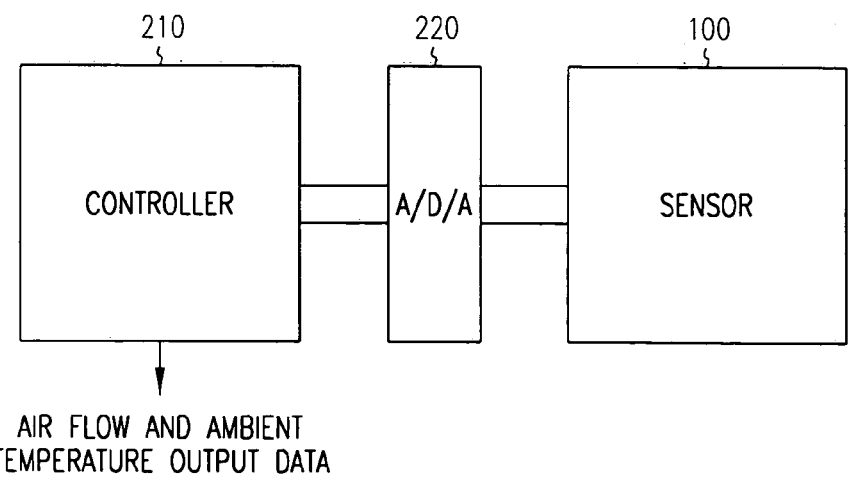
FIG. 2 is a block diagram of the sensor of FIG. 1 with a controller and converting circuitry according to an example embodiment.

FIG. 2 is a block diagram showing a controller 210 and A/D and D/A conversion circuitry 220 for interfacing with sensor 100. The controller 210 is a microcontroller in one embodiment, and provides signals to control the heating switch and measuring switch, as well as receiving measurement output from the Op Amp 120. In one embodiment, the controller 210 implements the following process by controlling the sensor 100.

Figure 3:
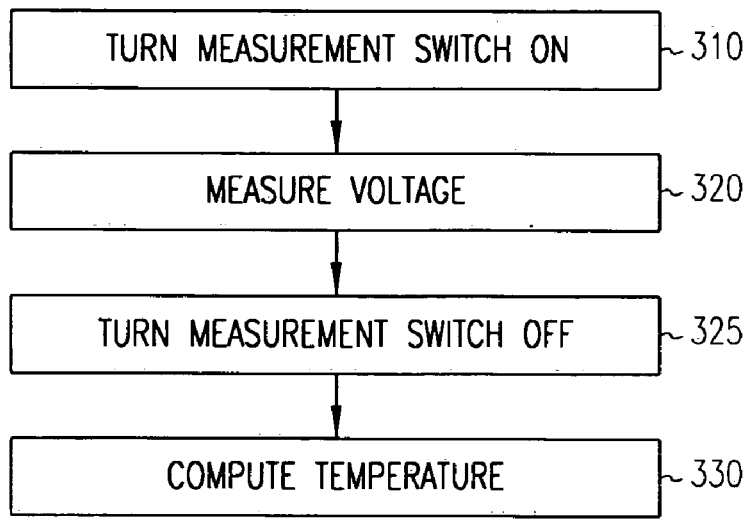
FIG. 3 is a flow chart describing temperature measurements according to an example embodiment.

FIG. 3 is a flow diagram showing how controller 210 uses the sensor to obtain temperature measurements. At 310, the controller 210 turns on the measurement switch, FET 130, allowing current to flow through thermistor 105, providing a voltage representative of temperature to Op Amp 120. At 320, the controller obtains a digital representation of the voltage from circuitry 220. The measurement switch, FET 130 is turned off at 325, and the controller computes the temperature based on digital data obtained. The temperature in one embodiment is a function of the voltage, which is a function of the resistance of the thermistor. The relationship between resistance and temperature is known, and may be computed by use of a look up table, or other mathematical relationship between the two.

Figure 4:
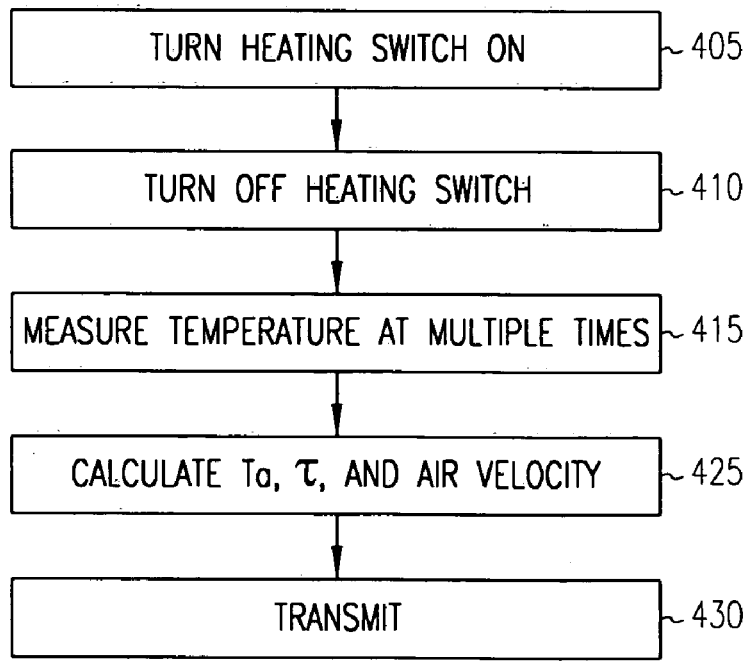
FIG. 4 is a flow chart describing computing mass air flow according to an example embodiment.

FIG. 4 is a flow diagram of the complete process of computing mass air flow using multiple temperature measurements and pulsed heating of the thermistor. Again, it may be implemented by the controller 210. At 405, a heating switch is turned on. At 410, after the thermistor has been heating for some time, 400 milliseconds in one embodiment, the heating switch, FET 125, is turned off. Multiple temperature measurements, T1, T2 and T3, at different times t1, t2 and t3 are taken at 415 in accordance with the process of FIG. 3. In one embodiment, the measurements are taken at times of 0 mS, 200 mS and 400 mS.

At 425, the controller makes several calculations to arrive at the mass air flow. Ambient air temperature Ta is calculated, the time decay constant, $\tau$, is calculated, and the mass air flow is then calculated. The calculated values may then be transmitted to a central controller in a process control system, or otherwise communicated to interested parties. Thermistor temperature decays exponentially to the ambient temperature with a fixed time constant. Moving air reduces the cooling time constant. Through calibration, airflow is computed from the reduction in cooling time constant.

With heating current off, resistance is measured at three equally spaced times as the thermistor cools. Three thermistor temperatures are computed. Two equations are then solved; the first for ambient air temperature, and the second for thermistor temperature decay time constant, $\tau$. Equal time increments are used in one embodiment:

$$t2-t1 = t3-t2 = \Delta t \quad (1)$$

Choosing equal time increments simplifies the mathematical discussion. Non-equal time increments may also be used. Accurate control of the time increments between temperature measurements should be maintained. Ta=Ambient Temperature. The following algorithm is used to calculate the values.

T1=Temperature at time t1

T2=Temperature at time t2

T3=Temperature at time t3

$$T2-Ta = (T1-Ta)e^{-(t2-t1)/\tau} \quad (2)$$

$$T3-Ta = (T2-Ta)e^{-(t3-t2)/\tau} \quad (3)$$

Combining (1), (2), and (3), results in:

$$\frac{T2-Ta}{T1-Ta} = \frac{T3-Ta}{T2-Ta} = e^{-\Delta t/\tau} \quad (4)$$

T1, T2, and T3 are known. Therefore, (4) can be solved for Ta:

$$Ta = \frac{T1*T3 - T2*T2}{T1+T3 - 2*T2} \quad (5)$$

With Ta known, (4) can be solved for $\tau$:

$$-\Delta t/\tau = Ln((T2-Ta)/(T1-Ta)) \quad (6)$$

The longest time constant, $\tau$, is for zero airflow. $\tau$ decreases as mass air flow increases. Mass airflow is computed from the change in $\tau$.

In a further embodiment of a sensor 100 in FIG. 1, a single FET Switch 130 and Resistor 110 is used to heat Thermistor 105 and to measure resistance of Thermistor 105. For heating, Switch 130 is left on for several hundred milliseconds to raise the temperature of Thermistor 105 approximately 50 degrees C. above ambient temperature. For measuring temperature of Thermistor 105, the measurement cycle of FIG. 3 is used. The Measurement switch 130 is turned on for approximately 20 microseconds.

In the complete measurement process of FIG. 4. process 415 may be invoked on a schedule of, typically, 200 milliseconds. Thus, heating current is on for only approximately 0.01% of the total time. The effect is to raise temperature of Thermistor 105 by less than 1 degree C. Thus, one may both heat the thermistor and measure its temperature without significant self-heating by utilizing a single Switch 130, and Resistor 110.

Figure 5:
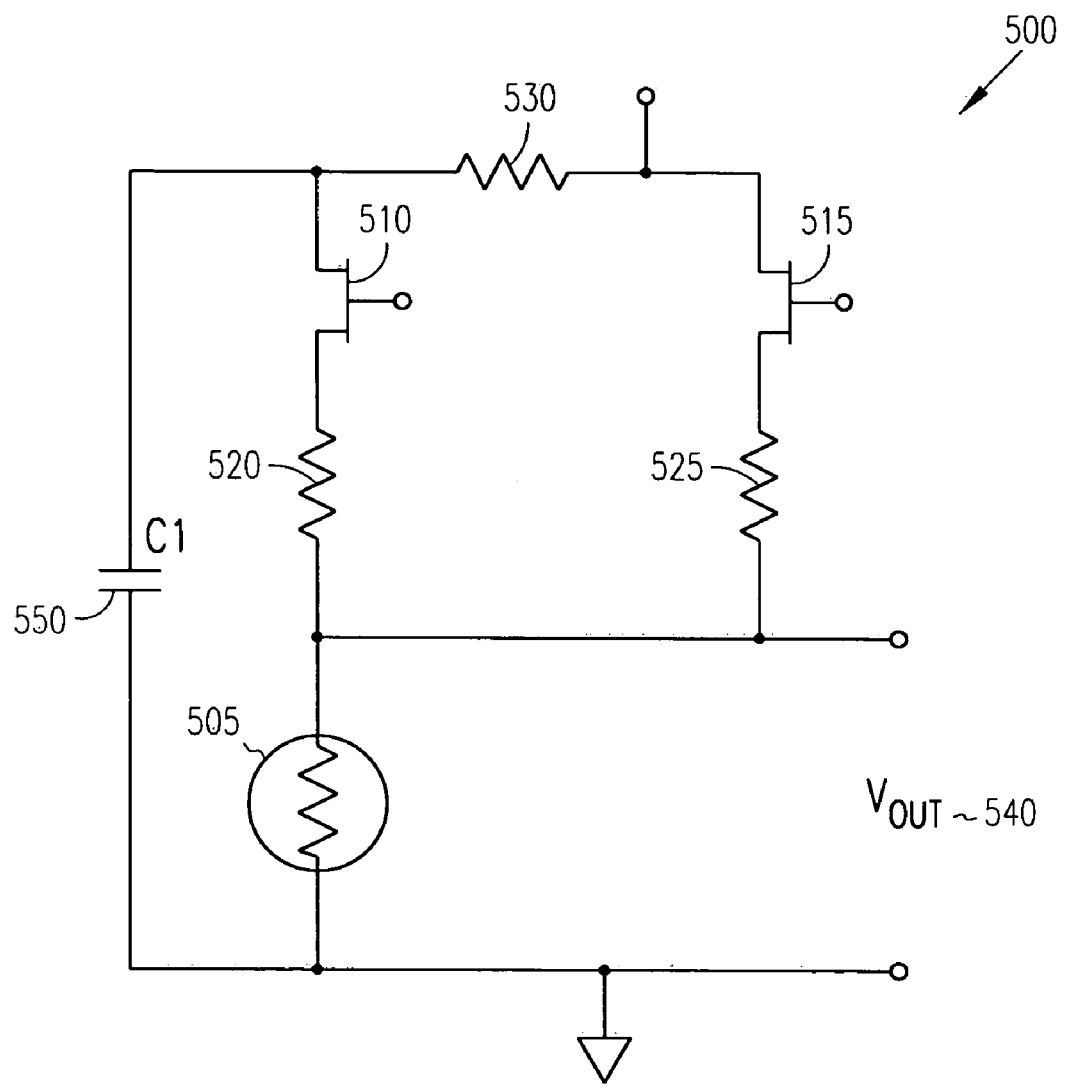
FIG. 5. is a block circuit diagram of a thermistor based mass air flow sensor according to an alternate example embodiment

In a further embodiment of a sensor 500 in FIG. 5, a 750$\Omega$, 0.36 mm diameter, heated thermistor 505 with a still-air time constant of 1 second is used. Current through a first FET 510 and resistor 520 supplies energy to the thermistor 505. Current through a second FET 515 and resistor 525 supplies current for measurement of thermistor 505 resistance. In one embodiment the resistor values are approximately resistor 520=50$\Omega$, resistor 525=1500$\Omega$, resistor 530=1500$\Omega$, and Capacitor 550=100 microfarads. The controller 210 in this embodiment controls sensor 500 as follows.

P-channel FET 510 is turned on to heat the thermistor. Energy in Capacitor 550 is transferred to Thermistor 505 through Resistor 520. After FET 510 is turned off, FET 515 is turned on briefly, and Vout at 540 is recorded by the controller. Thermistor resistance and temperature is computed from Vout. Energy for heating the thermistor is accumulated in a capacitor, C1 at 550 while the thermistor 505 is cooling down. Energy is slowly accumulated in the capacitor 550 and quickly discharged into the thermistor, thus reducing the peak current drain from the power supply. This implementation also provides over-temperature protection in the event that the controller fails to turn FET 510 off.

The complete airflow measurement cycle using sensor 500 is:

Turn FET 510 on.
Wait for the thermistor to heat up.
Turn FET 510 off.
Measure thermistor temperature at t=0 mS
Measure thermistor temperature at t=200 mS
Measure thermistor temperature at t=400 mS
Compute Ta, $\tau$, and mass airflow
Transmit airflow and ambient temperature data.
Repeat the measurement cycle.

In one embodiment, the current used for resistance measurement is turned off when not required. This may significantly reduce the average power dissipation of the heated thermistor and makes determination of Ta more accurate. It also allows a high resistance-measuring current to be used, thus increasing the voltage supplied to the A/D converter, and making circuit design simpler.

In a further embodiment, the thermistor is heated to remain warm when not taking temperature measurements. This helps avoid condensation of oils and/or particulate matter on the device. In one embodiment, this is done by maintaining the resistance measurement current on between measurements. Because the resistance-measurement current is high in one embodiment, the thermistor typically goes to ~20° C. above ambient air temperature—high enough so that the thermistor remains free of contamination.

In further embodiments, the current used for resistance measurement is kept on at all times. A low current may be used to keep thermal dissipation down. This means low Vout, and consequently electronic gain may be required between the heated thermistor and the A/D converter.

The times and component values in the embodiments described may be significantly varied, and fine tuned for each implementation. The embodiments described may provide lower parts cost over prior mass airflow sensors and reduced power consumption. Calibration costs may also be reduced since unit-to-unit calibration differences depends only on the thermal dissipation properties of the heated thermistor. Compared with prior devices, the dependence of calibration factor on ambient air temperature is reduced. Temperature decay of the thermistor may be dependent solely on the temperature difference between the heated thermistor and ambient air. This leads to conclusion that the temperature decay time constant is substantially independent of ambient temperature. This, in turn, implies reduced calibration time. It may also be easier to calibrate the device over a range of ambient air temperatures.

Using circuit 100, another implementation utilizes the rate at which the temperature of thermistor 105 rises to determine air velocity. In general, thermistor 105 temperature will rise more rapidly at low air velocity than at high air velocity.

Using circuit 100, another implementation operates by holding the temperature of thermistor 105 constant. This may be done utilizing resistance measurement. Using the same circuit 100, current in thermistor 105 is measured. Power dissipation in thermistor 105 is computed. In general, the power dissipation will be higher at high air velocity than at low air velocity. Air velocity may be computed from power dissipation at constant velocity.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method comprising:
heating a thermistor for a limited time;
measuring multiple temperatures of the thermistor at known time intervals to determine a temperature decay time constant, wherein measuring multiple temperatures comprises:
providing a measuring current to the thermistor;
waiting a predetermined time after providing the measuring current to the thermistor prior to measuring a voltage across the thermistor; and
calculating and transmitting a mass airflow value as a function of the temperature decay time constant.

2. The method of claim 1 wherein at least three temperatures of the thermistor are measured after heating for the limited time.

3. The method of claim 1 wherein the measuring current is provided continuously.

4. The method of claim 1 and further comprising transmitting the mass airflow value.

5. A method comprising:
heating a thermistor for a limited time;
measuring multiple temperatures of the thermistor at known time intervals to determine a temperature decay time constant wherein three temperatures T1, T2 and T3 are measured at equal time intervals t1, t2 and t3 after the limited time;
calculating and transmitting a mass airflow value as a function of the temperature decay time constant; and
calculating ambient temperature as $$Ta = \frac{T1 * T3 - T2 * T2}{T1 + T3 - 2 * T2}.$$

6. The method of claim 5 wherein mass airflow is calculated as a function of $-\Delta t/\tau = \text{Ln}((T2-Ta)/(T1-Ta))$, where $\tau$ is the $_{13}$temperature decay time constant.

7. The method of claim 5 wherein the temperature decay constant is calculated based on the temperature measurements.

8. A method comprising:
providing heating current to a thermistor for a limited time;
measuring multiple temperatures of the thermistor at known time intervals after the limited time, wherein measuring multiple temperatures comprises:
providing a measuring current to the thermistor;
waiting a predetermined time after providing the measuring current to the thermistor prior to measuring a voltage across the thermistor; and
calculating and transmitting an ambient temperature, a temperature decay constant and mass airflow values as a function of the multiple temperatures and time intervals.

9. The method of claim 8 repeated at predetermined intervals.

10. The method of claim 8 wherein the limited period of time is between approximately 40 milliseconds and 400 milliseconds.

11. The method of claim 8 wherein the time intervals are approximately equal.

12. The method of claim 11 wherein the time intervals are approximately 200 milliseconds.

13. The method of claim 8 wherein heating current is provided by a storage element.

14. The method of claim 13 wherein the storage element is a capacitor.

15. The method of claim 8 wherein the heating current is provided to keep the thermistor heated outside the known time intervals when multiple temperature are measured.

16. The method of claim 8 and further comprising electronically amplifying the measured temperatures of the thermistor.

17. A mass airflow sensor comprising:
a thermistor having a resistance that varies with temperature;
a first switch coupled to the thermistor that selectively provides energy to the thermistor;

a second switch coupled to the thermistor that selectively provides measuring current to the thermistor; and wherein the first and second switches each have a resistor coupled in series with the switch and thermistor.

18. The mass airflow sensor of claim 17 and further comprising means for determining multiple temperatures over time after energy has been provided to the thermistor.

19. The mass airflow sensor of claim 17 and further comprising a capacitor coupled in parallel with the first switch and the thermistor.

20. The mass airflow sensor of claim 17 and further comprising an amplifier coupled across the thermistor.

21. The mass airflow sensor of claim 20 wherein the amplifier provides an amplified low impedance output representative of a voltage across the thermistor.

22. A controller for implementing a method comprising:

initiating heating a thermistor for a limited time;

receiving multiple temperature measurements of the thermistor at known time intervals, wherein measuring multiple temperatures comprises:

providing a measuring current to the thermistor;

waiting a predetermined time after providing the measuring current to the thermistor prior to measuring a voltage across the thermistor; and calculating and transmitting a mass airflow value as a function of the multiple temperatures and time intervals which are representative of a temperature decay time constant.

23. A computer readable medium having a program stored thereon for causing a computer to implement a method comprising:

initiating heating a thermistor for a limited time;

receiving multiple temperature measurements of the thermistor at known time intervals, wherein measuring multiple temperatures comprises:

providing a measuring current to the thermistor;

waiting a predetermined time after providing the measuring current to the thermistor prior to measuring a voltage across the thermistor; and calculating and transmitting a mass airflow value as a function of the multiple temperatures and time intervals which are representative of a temperature decay time constant.

24. A method comprising:

heating a thermistor above ambient temperature;

measuring temperature decay of the thermistor; calculating a temperature decay time constant that is substantially independent of ambient temperature, wherein measuring multiple temperatures comprises:

providing a measuring current to the thermistor;

waiting a predetermined time after providing the measuring current to the thermistor prior to measuring a voltage across the thermistor; and determining and transmitting mass airflow as a function of the calculated temperature decay time constant.

25. The method of claim 24 wherein the temperature decay is representative of air velocity about the thermistor.

26. A method comprising:

heating a thermistor for a limited time;

measuring multiple temperatures of the thermistor at known time intervals to derive ambient temperature and determine a temperature decay time constant from such multiple temperatures and derived ambient temperature, wherein measuring multiple temperatures comprises:

providing a measuring current to the thermistor;

waiting a predetermined time after providing the measuring current to the thermistor prior to measuring a voltage across the thermistor; and calculating and transmitting a mass fluid flow value as a function of the temperature decay time constant.

* * * * *